(12) United States Patent
Liu et al.

(10) Patent No.: US 9,864,803 B2
(45) Date of Patent: Jan. 9, 2018

(54) METHOD AND SYSTEM FOR MULTIMODAL CLUE BASED PERSONALIZED APP FUNCTION RECOMMENDATION

(71) Applicant: TCL RESEARCH AMERICA INC., San Jose, CA (US)

(72) Inventors: Mengwen Liu, San Jose, CA (US); Yue Shang, San Jose, CA (US); Lifan Guo, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 333 days.

(21) Appl. No.: 14/805,830

(22) Filed: Jul. 22, 2015

(65) Prior Publication Data

US 2017/0024389 A1 Jan. 26, 2017

(51) Int. Cl.
*G06F 7/02* (2006.01)
*G06F 17/30* (2006.01)

(52) U.S. Cl.
CPC .. *G06F 17/30864* (2013.01); *G06F 17/30386* (2013.01); *G06F 17/30554* (2013.01); *G06F 17/30867* (2013.01)

(58) Field of Classification Search
CPC ......... G06F 17/30554; G06F 17/30867; G06F 17/3053; G06F 17/30396; G06F 17/30864
See application file for complete search history.

(56) References Cited

U.S. PATENT DOCUMENTS

| | | | | |
|---|---|---|---|---|
| 2013/0325856 | A1* | 12/2013 | Soto Matamala | .. G06F 17/3089 707/724 |
| 2015/0186533 | A1* | 7/2015 | Patil | ................. G06F 17/30867 707/723 |
| 2016/0071024 | A1* | 3/2016 | Amer | ................... G06N 99/005 706/12 |
| 2016/0188681 | A1* | 6/2016 | Savliwala | ......... G06F 17/30554 707/722 |
| 2016/0299977 | A1* | 10/2016 | Hreha | ............... G06F 17/30867 |

FOREIGN PATENT DOCUMENTS

| CN | 103761104 A | 4/2014 |
|---|---|---|
| CN | 103995704 A | 8/2014 |

\* cited by examiner

*Primary Examiner* — Bruce M Moser
(74) *Attorney, Agent, or Firm* — Anova Law Group, PLLC

(57) ABSTRACT

A method for multimodal clue based personalized app function recommendation is provided. The method includes receiving an app search query from a user, obtaining a plurality of real-time clues collected from the user and extracting a plurality of features to represent the collected clues, wherein the plurality of features include structured features and text features. The method also includes generating a joint representation of the multimodal clues based on the plurality of extracted features and creating a logistic regression model based on the joint representation of the multimodal clues. Further, the method includes ranking a list of app functions using the logistic regression model and displaying the ranked app function list for the user.

16 Claims, 3 Drawing Sheets

METHOD AND SYSTEM FOR MULTIMODAL CLUE BASED PERSONALIZED APP FUNCTION RECOMMENDATION

FIELD OF THE INVENTION

The present invention generally relates to the field of information technologies and, more particularly, to methods and systems for multimodal clue based personalized app function recommendation.

BACKGROUND

Nowadays, mobile apps have become an indispensable part of modern human life. In July 2014, there are about 1.3 million apps and 1.2 million apps in Google Play app store and Apple App Store, respectively. As the number of apps is huge, it is extremely hard for the users to find apps without recommendation functions. The term app or application is "a computer program designed for a specific task or use". In other words, the app is defined by app functions that enable the users to perform specific tasks. The app function refers to a content page or functionality in a mobile app, such as "a restaurant's reviews" in Yelp, or "get directions" from one place to another in Google Map.

Recommendation systems play an important role in human life, greatly facilitating people's daily lives through providing information to the users. The recommendation systems suggest items based on user profile without asking for the user's needs. The recommendation systems are generally classified into two major systems: collaborative filtering systems and content-based recommendation systems. The collaborative filtering systems recommend items that other users with similar tastes preferred in the past while the content-based systems generally recommend items similar to those preferred by the users in the past. The recommendation systems may be more convenient for the user since the user does not need to input his or her needs.

However, considering an app usually consists of a lot of content pages or functionalities (defined as app functions), it is often tedious for the user to reach for a specific app function even if an app is open before the user clicks an app icon, it still needs to take a while for the user to reach for the needed content page or functionality inside the app. In current studies, few methods collect text data in the app functions as clues to make prediction.

The disclosed methods and systems are directed to solve one or more problems set forth above and other problems.

BRIEF SUMMARY OF THE DISCLOSURE

One aspect of the present disclosure includes a method for multimodal clue based personalized app function recommendation. The method includes receiving an app search query from a user, obtaining a plurality of real-time clues collected from the user and extracting a plurality of features to represent the collected clues, wherein the plurality of features include structured features and text features. The method also includes generating a joint representation of multimodal mobile clues (also called as multimodal clues) based on the plurality of extracted features and creating a logistic regression model based on the joint representation of the multimodal clues. Further, the method includes ranking a list of app functions using the logistic regression model and displaying the ranked app function list for the user.

Another aspect of the present disclosure includes a system for multimodal clue based personalized app function recommendation. The system includes a mobile clues module configured to obtain a plurality of real-time clues collected from a user. The system also includes a user preference repository module configured to extract a plurality of features to represent the collected clues and generate a joint representation of multimodal clues based on the plurality of extracted features, where the plurality of features include structured features and text features. Further, the system includes an app function recommendation module configured to create a logistic regression model based on the joint representation of the multimodal clues and rank a list of app functions using the logistic regression model and an app functions module configured to display the ranked app function list for the user.

Another aspect of the present disclosure includes a non-transitory computer-readable medium having computer program. When being executed by a processor, the computer program performs a method for multimodal clue based personalized app function recommendation. The method includes receiving an app search query from a user; obtaining a plurality of real-time clues collected from the user; and extracting a plurality of features to represent the collected clues, wherein the plurality of features include structured features and text features. The method also includes, based on the plurality of extracted features, generating a joint representation of multimodal clues and, based on the joint representation of the multimodal clues, creating a logistic regression model. Further, the method includes ranking a list of app functions using the logistic regression model; and displaying the ranked app function list for the user.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
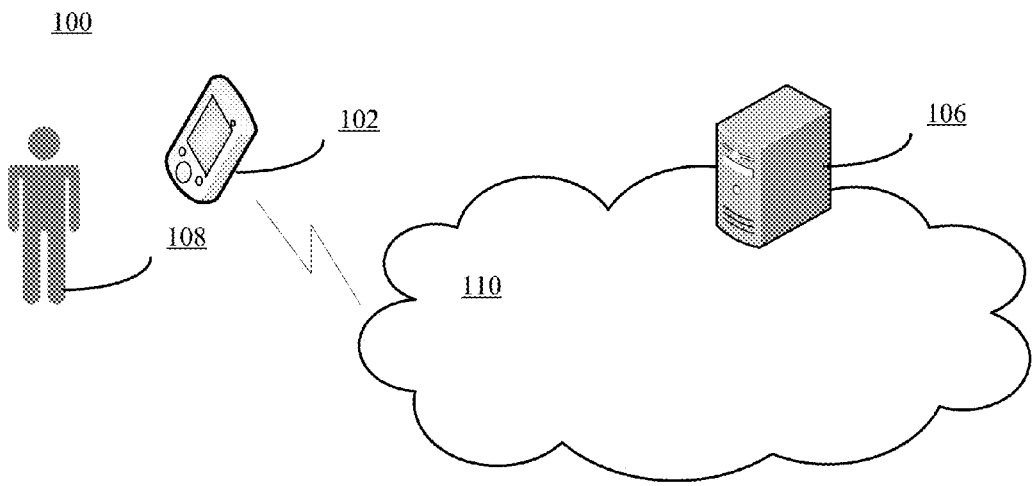
FIG. 1 illustrates an exemplary environment incorporating certain embodiments of the present invention.

FIG. 1 illustrates an exemplary environment 100 incorporating certain embodiments of the present invention. As shown in FIG. 1, environment 100 may include a mobile terminal 102, a server 106, a user 108 and a network 110.

Mobile terminal 102 (also known as the mobile terminal device) may refer to any appropriate user mobile terminal with certain computing capabilities, such as a hand-held computing device (tablet), a smart phone or mobile phone, or any other user-side mobile computing device. Mobile terminal 102 may be implemented on any appropriate mobile computing platform. Mobile terminal 102 may be used by user 108 to connect to network 110 and make requests to server 106. The mobile terminal 102 may obtain information from any appropriate sources, such as from a local storage device, from a wired or wireless network device of a service provider, or from the Internet. The mobile terminal 102 may also be configured to access the functionalities of various applications for varying computing environments. For example, the mobile terminal 102 may be configured to execute apps stored on the mobile terminal 102.

Further, the server 106 may refer to one or more server computers configured to provide certain web server functionalities (e.g., a search server). The server 106 may include one or more processors to execute computer programs in parallel. The server 106 may store data (e.g., app names) to be access by the mobile terminals and application software (e.g., an app recommendation system).

Mobile terminal 102 and server 106 may communicate with each other through communication network 110, such as a cable network, a phone network, and/or a satellite network, etc. Although one mobile terminal 102 and one server 106 are shown in FIG. 1, any number of mobile terminals and/or servers may be included.

Figure 2:
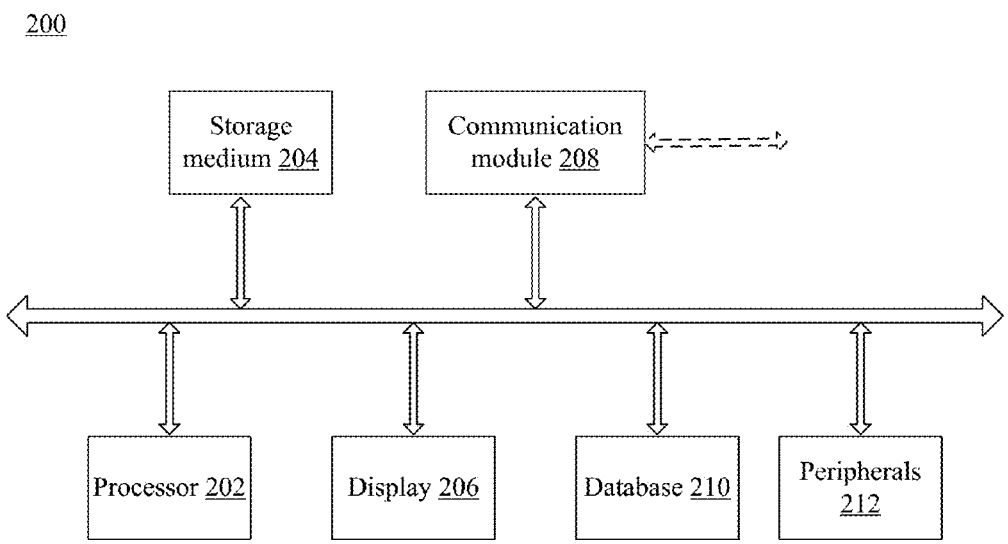
FIG. 2 illustrates an exemplary computing system consistent with the disclosed embodiments.

Mobile terminal 102 and/or server 106 may be implemented on any appropriate computing circuitry platform. FIG. 2 shows a block diagram of an exemplary computing system 200 capable of implementing mobile terminal 102 and/or server 106.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data (e.g., app descriptions) and for performing certain operations on the stored data, such as app recommendation.

Figure 3:
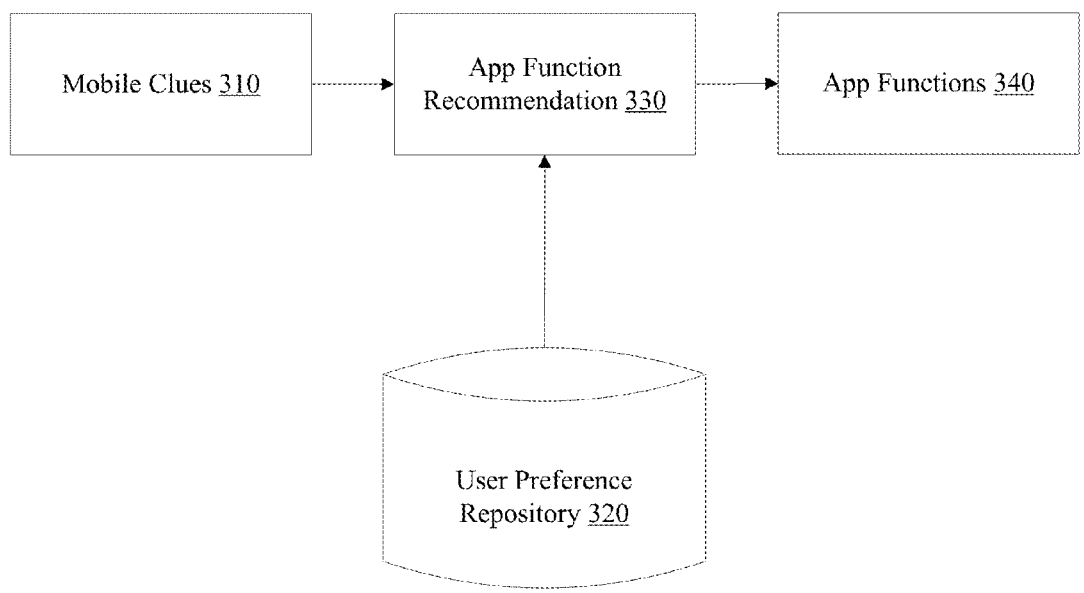
FIG. 3 illustrates an exemplary system for multimodal clue based personalized app function recommendation consistent with the disclosed embodiments.

Mobile terminal 102 may provide requests to server 106 from the user 108, and server 106 may respond with the received requests. The app recommendation system may use a Deep Boltzmann Machine (DBM) to generate joint representations of the multimodal information and create a logistic regression model trained with the joint representations. Further, the app recommendation system may use the logistic regression model to predict the next app function that the user 108 is going to launch. FIG. 3 illustrates an exemplary system 300 for multimodal clue based personalized app function recommendation consistent with the disclosed embodiments.

As shown in FIG. 3, the system 300 may include a mobile clues module 310, a user preference repository module 320, an app function recommendation module 330, and an app functions module 340. Certain components may be omitted and other components may be added. Each of the modules can be processed by one or more computer systems.

The mobile clues module 310 may be configured to obtain real-time clues collected from mobile users. The obtained real-time clues are obtained from two perspectives: (1) structured signals that can be captured by multiple types of sensors, such as time, latitude, longitude, speed, GPS accuracy; (2) unstructured text data from app content pages or the user. The unstructured text data may be a block of unstructured text data from app content pages or entered by the users. For example, the text data can be a stream of social posts, a conversation among a group of friends, or a block of news marked by a user.

The user preference repository module 320 may be configured to extract a plurality of features (i.e., historical user preferences) to represent the collected clues and store the historical user preferences, wherein the plurality of features include structured features and text features. The historical user preferences may be used to train a logistic regression model in the app function recommendation module 330. As the prediction technique is based on the multimodal mobile clues representing the structured spatiotemporal signals and unstructured text data from app functions, the user preference repository module 320 may further apply a Deep Boltzmann Machine (DBM) to generate a joint representation of the multimodal mobile clues. DBM is described for learning a generative model of data that consists of multiple and diverse input modalities. DBM is a network of symmetrically coupled stochastic binary units. DBM contains a set of visible units $v \epsilon \{0, 1\}^D$, and a sequence of layers of hidden units $h_s^{(1)}, h_s^{(2)}, \ldots h_s^{(L)} \epsilon \{0,1\}$. There are connections only between hidden units in adjacent layers, as well as between the visible units and the hidden units in the first hidden layer. Two separate two-layer DBMs are constructed to model distribution over structured features and text features, respectively.

Figure 4:
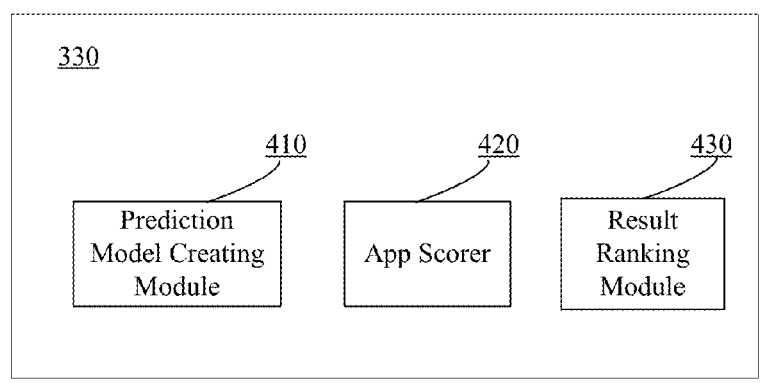
FIG. 4 illustrates an exemplary app function recommendation module consistent with the disclosed embodiments.

The app function recommendation module 330 may be configured to create a logistic regression model trained with the historical user preferences, and use the trained logistic regression model to predict the next app function(s) that the mobile user is going to launch based on the joint representation of the multimodal clues. That is, based on the joint representation of structured spatiotemporal signals and the unstructured text data, the logistic regression model is created to decide which app function the user is going to launch. FIG. 4 illustrates an exemplary app function recommendation module consistent with the disclosed embodiments.

As shown in FIG. 4, the app function recommendation module 330 may include a prediction model creating module 410, an app scorer 420, and a result ranking module 430. Certain components may be omitted and other components may be added. Each of the modules can be processed by one or more computer systems.

The prediction model creating module 410 may be configured to create a logistic regression model trained with historical user preferences. Further, the logistic regression model is supervised and general so that the model can be applied to other domains.

The app scorer 420 may be configured to calculate app scores to filter out irrelevant app functions during real-time recommendation process. The app score indicates the strength of association between a word and an app function. When the app function is strongly associated with a word, the app score may be higher.

The result ranking module 430 may be configured to, based on the calculated app scores, rank a list of relevant app functions that are scored. Based on the app scores, the result ranking module 430 may select a working subset of app functions from an initial set of app functions. For example, the result ranking module 430 may discard or remove the app functions that do not meet a threshold score. The user may set the number of app functions in the outputted ranked app function list. For example, a user may set 15 app functions in the ranked app function list.

In FIG. 3, the app functions module 340 may be configured to display a list of relevant app functions that are scored and outputted from the app function recommendation module 330. This ranked app function list may be formatted to be viewable on a mobile device used by the user.

Figure 5:
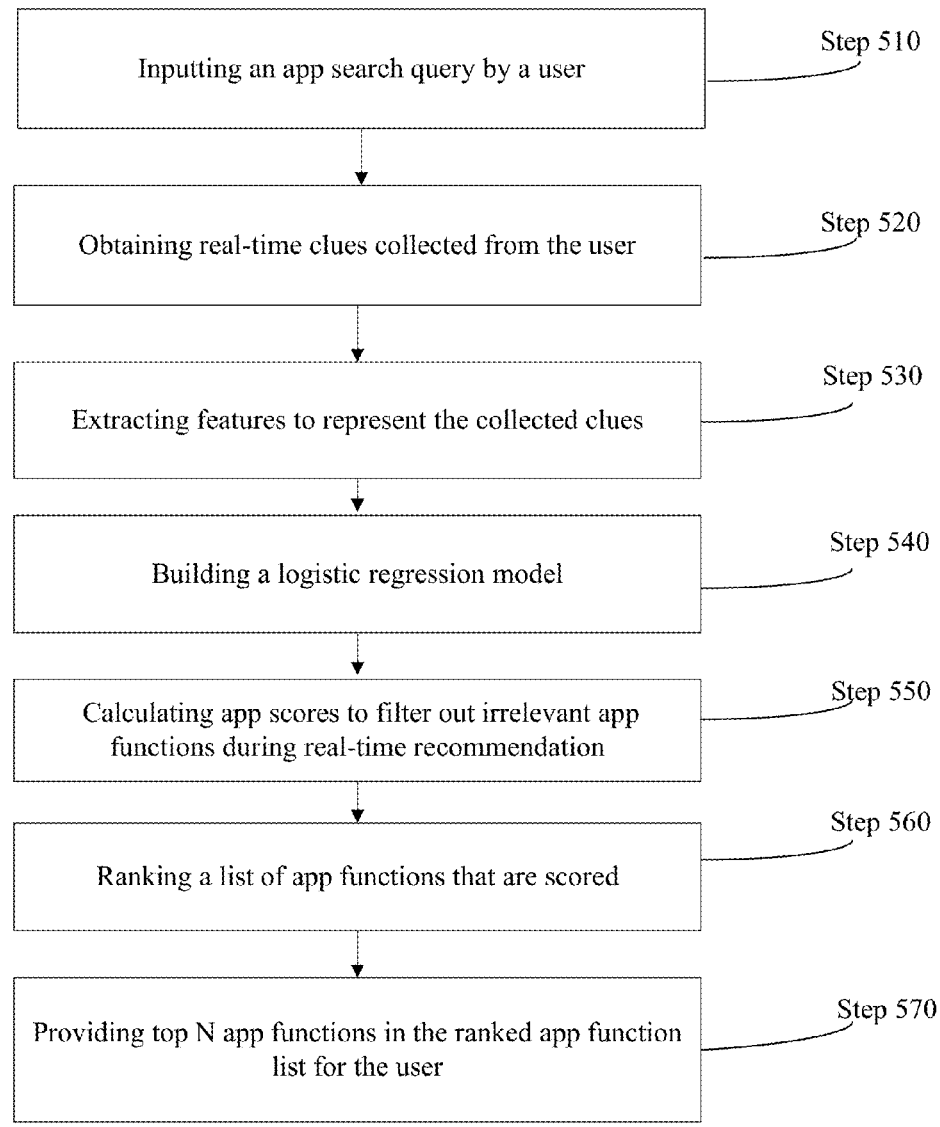
FIG. 5 illustrates a flow chart of an exemplary process for multimodal clue based personalized app function recommendation consistent with the disclosed embodiments.

In operation, the system 300 may perform certain processes to determine a list of applications or app functions. This list of app functions may be provided to the user in a form of the ranked app function list. FIG. 5 illustrates a flow chart of an exemplary process 500 for multimodal clue based personalized app function recommendation consistent with the disclosed embodiments.

As shown in FIG. 5, at the beginning, a user using a mobile device inputs an app search query into an app recommendation system (Step 510). The app search query inputted by the user may be a sentence or one or more keywords. Then, real-time clues collected from the user are obtained (Step 520). The real-time clues are obtained from two perspectives: (1) structured signals that can be captured by multiple types of sensors, such as time, latitude, longitude, speed, GPS accuracy; (2) unstructured text data from app content pages or the user. For example, the text data can be a streaming of social posts, a conversion among a group of friends, or even a block of news marked by a user.

Features are extracted to represent the collected clues (Step 530). Two types of features representing the clues include: (1) structured features: time, latitude, longitude, speed, etc., which can be captured by multiple types of sensors; (2) text features: bag-of-words representations of text clues. The bag-of-words is a simplifying representation used in natural language processing and information retrieval (IR). In the bag-of-words, a text (such as a sentence or a document) is represented as the bag (multi-set) of its words, disregarding grammar and even word order but keeping multiplicity.

In some embodiments, the keywords can be extracted from the collected clues. Such keywords may constitute useful entries for creating an automatic index for a document collection, can be used to classify a text, or may serve as a concise summary for a given document.

As the prediction technique is based on the multimodal mobile clues representing the structured spatiotemporal signals and unstructured text data from app functions (or apps), a Deep Boltzmann Machine (DBM) is applied to generate a joint representation of the multimodal clues.

Given a list of n app functions $\{f_1, \ldots, f_n\}$, multimodal clues C of a user u, the problem is to predict which next app function $f_i$ has the largest probability of being launched under C, which is defined by:

$$\mathrm{argmax}_{f_i} p(f_i | C), \text{ for } i=1 \ldots n. \quad (1)$$

The n number of key words $t_c = \{w_1, \ldots, w_n\}$ can be used to represent text clues. As the text data can be quite sparse and may contain a lot of noises, a function $f_t: T \rightarrow t_c$ is learned to transform a block of unstructured text data T to the text clues. Thus, the prediction for the app function $f_i$ with the largest probability can be treated as a problem of key word extraction from the text data. TextRank, one graph-based approach for the key word extraction, may be used to extract key word from the text. That is, a directed graph using words is created from the input text, and nodes of the directed graph are ranked according to importance degree of the word in the text using the TextRank.

The TextRank does not only rely on the local context of a text unit (vertex), but rather it takes into account information recursively drawn from the entire text (graph). Each node of the graph corresponds to a candidate word from the text. The edge of the graph connects two consecutive words, with the first word as a head and the second word as a tail. Formally, let G=(V,E) be a directed graph with a set of vertices V and a set of edges E, where $E \subseteq V \times V$. For a given vertex $V_i$, let in($V_i$) be a set of vertices that point to vertex $V_i$ (predecessors), and let out($V_i$) be a set of vertices that vertex $V_i$ points to (successors). The score of vertex $V_i$ is defined by:

$$\mathrm{score}(V_i) = (1-d) + d * \sum_{j \in in(V_i)} \frac{1}{|out(V_j)|} \mathrm{score}(V_j) \quad (2)$$

where $d \in [0,1]$ is a damping factor that can be set between 0 and 1, which has the role of integrating into the model the probability of jumping from a given vertex to another random vertex in the graph.

Starting from arbitrary values assigned to each node in the graph, the computation iterates until convergence below a given threshold is achieved. After running the TextRank algorithm, a score is associated with each vertex, which represents the "importance" of the word in the text. Convergence is achieved when the error rate for any vertex in the graph falls below the given threshold. The error rate of a vertex $V_i$ is defined as the difference between the "real" score of the vertex score ($V_i$) and the score computed at iteration k. Since the real score is not known a priori, this error rate is approximated with the difference between the scores computed at two successive iterations. It should be noted that the final values obtained after TextRank runs to completion are not affected by the choice of an initial value, only the number of iterations to convergence may be different. Top K words are selected to represent the text clues.

The joint representations of multimodal mobile clues are generated. The clues come through two channels: structured signals and unstructured text. If these two types of clues are simply concatenated into a feature vector, the fact that these two types of clues come from different input channels may be ignored. Therefore, a multimodal Deep Boltzmann Machine (DBM) is utilized to generate a joint representation of the multimodal mobile clues.

DBM is a network of symmetrically coupled stochastic binary units. DBM contains a set of visible units $v \in \{0, 1\}^D$, and a sequence of layers of hidden units $h_s^{(1)}, h_s^{(2)}, \ldots h_s^{(L)} \in \{0,1\}$. There are connections only between hidden units in adjacent layers, as well as between the visible units and the hidden units in the first hidden layer. Two separate two-layer DBMs are first constructed to model the distribution over structured features and text features respectively. Let $v_s \in R^D$ denote a structured input, and $h_s^{(1)}, h_s^{(2)} \in \{0,1\}$ be binary stochastic hidden units. The probability that the structured feature two-layer DBM assigns to $v_s$ is defined by:

$$p(v_s; \theta_s) = \sum_{h_s^{(1)}, h_s^{(2)}} p(v_s, h_s^{(1)}, h_s^{(2)}; \theta_s) = \frac{1}{z(\theta_s)} \sum_{h_s^{(1)}, h_s^{(2)}} \exp(-E(v_s, h_s^{(1)}, h_s^{(2)}; \theta_s)) \quad (3)$$

where $$E(v_s, h_s^{(1)}, h_s^{(2)}; \theta_s) = -\sum_{i=1}^{D} \frac{(v_{si} - b_j)^2}{2\sigma_i^2} + \sum_{i=1}^{D}\sum_{j=1}^{F_1} \frac{v_{si}}{\sigma_i} W_{ij}^{(1)} h_j^{(1)} + \sum_{j=1}^{F_1}\sum_{l=1}^{F_2} h_j^{(1)} W_{jl}^{(2)} h_l^{(2)}$$

is an energy function, and $\theta_s = \{b, W^{(1)}, W^{(2)}, \sigma\}$ are model parameters.

Similarly, $v_t \in N^K$ denotes a structured input, where $v_k$ is the number of times work k occurs in $v_t$ with the vocabulary of size K, and $h_t^{(1)}, h_t^{(2)} \in \{0,1\}$ are binary stochastic hidden units. The text-feature two-layer DBM assigns probability to $v_t$ that is given by:

$$p(v_t; \theta_t) = \sum_{h_t^{(1)}, h_t^{(2)}} p(v_t, h_t^{(1)}, h_t^{(2)}; \theta_t) = \frac{1}{z(\theta_t)} \sum_{h_t^{(1)}, h_t^{(2)}} \exp(-E(v_t, h_t^{(1)}, h_t^{(2)}; \theta_t)) \quad (4)$$

where: $E(v_t, h_t^{(1)}, h_t^{(2)}; \theta_t) = -\sum_{i=1}^{N}\sum_{j=1}^{F}\sum_{k=1}^{K} W_{ijk}^{(1)} h_j^{(1)} v_{ik} - \sum_{i'=1}^{M}\sum_{j=1}^{F}\sum_{k=1}^{K} W_{i'jk}^{(2)} h_j^{(1)} h_{i'k}^{(2)} - \sum_{i=1}^{N}\sum_{k=1}^{K} v_{ik} b_{ik}^{(1)} - (M+N)\sum_{j=1}^{F} h_j^{(1)} a_j - \sum_{i=1}^{M}\sum_{k=1}^{K} h_{ik}^{(2)} b_{ik}^{(2)}$ is the energy function and $\theta_t = \{W^{(1)}, W^{(2)}, a, b^{(1)}, b^{(2)}\}$ are model parameters.

Finally, the two DBMs are combined by adding an additional layer of binary hidden units $h^{(3)}$ on the top of the two-layer DBMs. The joint distribution over the multimodal clues can be defined by:

$$P(v_s, v_t; \theta) = \sum_{h_s^{(2)}, h_t^{(2)}, h^{(3)}} P(h_s^{(2)}, h_t^{(2)}, h^{(3)}) \left(\sum_{h_s^{(1)}} P(v_s, h_s^{(1)}, h_s^{(2)})\right) \left(\sum_{h_t^{(1)}} P(v_t, h_t^{(1)}, h_t^{(2)})\right) \quad (5)$$

A Markov Chain MONTE CARLO (MCMC) based a stochastic approximation procedure can be used to approximate the model's expected sufficient statistics.

Based on the generated joint representation of the multimodal clues, a logistic regression model is created (Step 540). The joint representation $h^{(3)}$ on the top layer can be used to train the logistic regression model. The logistic regression model can be used to predict which app function launched by the user in the near future based on the extracted features from the real-time mobile clues.

Further, app scores are calculated to filter out irrelevant app functions during real-time recommendation (Step 550). The app score indicates the strength of association between a word and an app function. If a document is very likely to contain a keyword that appears frequently, then the app function may be strongly associated with that word (e.g., an association score of "hotel" for booking hotel in Expedia is large). The app function recommendation works in both an offline mode and an online mode.

For the offline mode, the logistic regression model for launching the app function is trained using historical user preferences. The joint representations of multimodal mobile clues are used to create a logistic regression model to enable the prediction. Specifically, $c = \langle x_1, \ldots, x_n \rangle$ can be defined as the joint representations for certain mobile clues, where $x_i$ is a variable representing the weight of the $i^{th}$ feature. A Boolean variable y denotes the next app function launched by the user. Then, the logistic regression model is defined by:

$$p(y=1|x;\theta) = 1/(1+e^{-\theta^T x}) \quad (6)$$

For the online mode, the process of the real-time app function recommendation is described in the following two steps.

First, the text clues $t_C$ discovered from the text can be used as a query for searching for the relevant app functions. A query-likelihood model can be used to retrieve the app functions. Provided with an app function repository F, where document representations of F can be denoted as $d_F$, the model calculates a score with respect to each app function f∈F along with the query q. The score is calculated by:

$$\text{score}(q, f) = \Pi_{w \in q} \lambda p_{MLE}(w|d_f) + (1-\lambda) p_{MLE}(w|d_F) \quad (7)$$

where $$p_{MLE}(w|f) = \frac{\text{count}(w, d_f)}{|d_f|}, \text{ and } p_{MLE}(w|F) = \frac{\text{count}(w, d_F)}{|d_F|};$$

count (•) denotes the number of times word w occurred in a document; and $\lambda$ is a smoothing parameter.

Second, the trained logistic regression model can be used to predict the probability of the app function f launched by the user. The probability of the app function f launched by the user is calculated by:

$$p(y=1|f;\theta) = \frac{1}{1+e^{\theta^T f}} \quad (8)$$

A list of app functions that are scored can be sorted based on the calculated probability (Step 560). The score may indicate how closely each application matches a determined intent of the user. Based on the scores for the app functions, a working subset of app functions is selected from the initial set of app functions. For example, app functions that do not meet a threshold score may be discarded or removed.

For the same user, an app with the largest prediction score has the strongest relevance to the user intent. Therefore, the app with the largest prediction score is ranked first place in the ranked app function list. An app with the smallest prediction score has the weakest relevance to the user intent. Therefore, the app with the smallest app score is ranked last place in the ranked app function list.

Finally, the top N app functions in the ranked app function list are provided for the user (Step 570). N is an integer that is more than 1. Mobile devices (e.g., mobile phones, tablet, smart watches) have small display screens, so the user may set the N number of app functions in the outputted ranked app function list according to the size of the display screen of the mobile device used by the user. For example, a user may set 15 app functions in the ranked app function list. Specifically, this ranked app function list may be formatted and provided to a user's device so that a user can view and browse the ranked app function list. Selection of any of the app functions on the ranked app function list by the user results in the user being brought to an app function launch page associated with that app function. The user may select one or more app functions from the recommendations made by the system; the user may also choose another app function that is not included in the recommendations; or the user does not choose any app function at all. The user's activity can be added to the user preference repository to enrich historical data.

The disclosed systems and methods can also be applied to other devices with displays, such as smart phones, tablets, smart watches. That is, the disclosed methods not only can be used for app recommendation systems, but also can be applied as the core function for other systems, such as social media systems, information retrieval systems, or any user interactive systems.

For example, a user wants to rent a car. At the beginning, the user inputs a search query "rent a car" on an app search bar in a browser installed in his/her mobile phone. After an app recommendation system receives the app search query (i.e., "rent a car") inputted by the user, based on the received app search query, the app recommendation system collects real-time clues from the users. The real-time clues may include structured signals (such as time, latitude, longitude, GPS accuracy) and unstructured text data from the user.

For example, if a user is in Hilton Washington hotel, structured signals include the current address of the user is 1919 Connecticut Ave NW, Washington D.C., and time is May 1, 2015; unstructured text data is obtained from what the user shares when the user posts from the top of News Feed in his/her Facebook, a conversation about cars among a group of friends, and webpages about the newest car model browsed by the user. Then, the app recommendation system may extract features to represent the collected clues.

For example, the extracted features represent that the user shares Honda News with his/her friends, and the user browses webpages about Honda car frequently. Based on the extracted features, a logistic regression model is created. The logistic regression model predicts that one or more app functions for renting a Honda car will be launched by the user in the near future based on the extracted features from the real-time mobile clues. That is, the word "Honda" appears frequently, then the app Hertz is strongly associated with that word (e.g., an association score of "Honda" for the app Hertz is large).

Further, the app recommendation system may calculate app scores to filter out irrelevant app functions during real-time recommendation. The app recommendation system sorts a list of app functions (e.g., app function pages in Hertz, Budget, and Avis) that are scored based on the calculated scores. The score may indicate how closely each application matches a determined intent of the user.

Finally, the app recommendation system provides the top 15 app functions in the ranked app function list that the user is most likely interested in by implementing the model for the user. An app Hertz page associated with a local Hertz dealer on the ranked app function list selected by the user results in the user being brought to an app function launch page associated with the local Hertz dealer that has a Honda car for rent near 1919 Connecticut Ave NW, Washington D.C. Or the user may also input another searching query to the app recommendation system to start another app searching operation.

The disclosed methods and systems may use a Deep Boltzmann Machine (DBM) to generate the joint representation of the multimodal clues and create a logistic regression model trained with the joint representation. The logistic regression model is supervised and general so that it can be applied to other domains. For example, app recommendation systems may be integrated in smart phones to help organize and share information valuable to assist in booking a flight, reserving a restaurant, researching a doctor, choosing movies, choosing services and shops, renting DVDs, buying books, etc.

Other steps may be referred to above descriptions with respect to the system for making a unified attractiveness prediction. Other applications, advantages, alternations, modifications, or equivalents to the disclosed embodiments are obvious to those skilled in the art.

What is claimed is:

1. A method for multimodal clue based personalized app function recommendation, comprising:
   receiving an app search query from a user;
   obtaining a plurality of real-time clues collected from the user;
   extracting a plurality of features to represent the plurality of real-time clues collected from the user, wherein the plurality of features include structured features and text features;
   based on the plurality of extracted features, generating a joint representation of a multimodal clue, comprising:
      using a multimodal Deep Boltzmann Machine (DBM) to construct two separate two-layer DBMs to model distribution over the structured features and the text features respectively; and
      combining the two separate two-layer DBMs by adding an additional layer of binary hidden units on the top of the two-layer DBMs;
   based on the joint representation of the multimodal clue, creating a logistic regression model;
   ranking a list of app functions using the logistic regression model; and
   displaying a ranked app function list for the user.

2. The method according to claim 1, wherein obtaining the plurality of real-time clues collected from the user further includes:
   collecting structured spatiotemporal signals captured by multiple types of sensors, wherein the structured spatiotemporal signals include at least one of time, latitude, longitude, speed, and GPS accuracy; and
   collecting unstructured text data from one of app content pages and the user.

3. The method according to claim 1, wherein ranking the list of app functions using the logistic regression model further includes:
   calculating app scores to filter out irrelevant app functions; and
   based on the calculated app scores, ranking the list of relevant app functions that are scored.

4. The method according to claim 3, wherein:
   provided that document representations of an app function repository F are denoted as $d_F$, a score with respect to each app function f∈F along with a query q is calculated by:

$$\text{score}(q,f) = \Pi_{w \in q} \lambda p_{MLE}(w|d_f) + (1-\lambda) p_{MLE}(w|d_F)$$

wherein $$p_{MLE}(w|f) = \frac{\text{count}(w, d_f)}{|d_f|}, \text{ and } p_{MLE}(w|F) = \frac{\text{count}(w, d_F)}{|d_F|};$$

count (•) denotes a total number of times word w occurred in a document; and λ is a smoothing parameter.

5. The method according to claim 1, further including:
based on the size of a display screen of a mobile device, setting, by the user, a total number of recommended app functions included in the ranked app function list.

6. The method according to claim 1, wherein:
provided that $v_s \in R^D$ denotes a structured input, and $h_s^{(1)}$, $h_s^{(2)} \in \{0,1\}$ are binary stochastic hidden units, a probability that the structured feature two-layer DBM assigns to vertex $v_s$ is defined by:

$$p(v_s; \theta_s) = \sum_{h_s^{(1)}, h_s^{(2)}} p(v_s, h_s^{(1)}, h_s^{(2)}; \theta_s) = \frac{1}{z(\theta_s)} \sum_{h_s^{(1)}, h_s^{(2)}} \exp(-E(v_s, h_s^{(1)}, h_s^{(2)}; \theta_s))$$

wherein $$E(v_s, h_s^{(1)}, h_s^{(2)}; \theta_s) = -\sum_{i=1}^{D} \frac{(v_{si} - b_i)^2}{2\sigma_i^2} + \sum_{i=1}^{D} \sum_{j=1}^{F_1} \frac{v_{si}}{\sigma_i} W_{ij}^{(1)} h_j^{(1)} + \sum_{j=1}^{F_1} \sum_{l=1}^{F_2} h_j^{(1)} W_{jl}^{(2)} h_l^{(2)}$$

is an energy function, and $\theta_s = \{b, W^{(1)}, W^{(2)}, \sigma\}$ are model parameters.

7. A system for multimodal clue based personalized app function recommendation, comprising:
a mobile clues module configured to obtain a plurality of real-time clues collected from a user;
a user preference repository module configured to:
extract a plurality of features to represent the plurality of real-time clues collected from the user, wherein the plurality of features include structured features and text features;
use a multimodal Deep Boltzmann Machine (DBM) to construct two separate two-layer DBMs to model distribution over the structured features and the text features, respectively; and
combine the two separate two-layer DBMs by adding an additional layer of binary hidden units on the top of the two-layer DBMs; and
based on the plurality of extracted features, generate a joint representation of a multimodal clue;
an app function recommendation module configured to create a logistic regression model based on the joint representation of the multimodal clue and rank a list of app functions using the logistic regression model; and
an app functions module configured to display a ranked app function list for the user.

8. The system according to claim 7, wherein the mobile clues module is further configured to:
collect structured spatiotemporal signals captured by multiple types of sensors, wherein the structured spatiotemporal signals include time, latitude, longitude, speed, and GPS accuracy; and
collect unstructured text data from one of app content pages and the user.

9. The system according to claim 7, wherein the app function recommendation module is further includes:
a prediction model creating module configured to create a logistic regression model trained with the joint representation of the multimodal clues;
an app scorer configured to calculate app scores to filter out irrelevant app functions; and a result ranking module configured to, based on the calculated app scores, rank the list of relevant app functions that are scored.

10. The system according to claim 9, wherein:
provided that document representations of an app function repository F are denoted as $d_F$, a score with respect to each app function $f \in F$ along with a query q is calculated by:

$$\text{score}(q,f) = \Pi_{w \in q} \lambda p_{MLE}(w|d_f) + (1-\lambda) p_{MLE}(w|d_F)$$

wherein $$p_{MLE}(w \mid f) = \frac{\text{count}(w, d_f)}{|d_f|}, \text{ and } p_{MLE}(w \mid F) = \frac{\text{count}(w, d_F)}{|d_F|};$$

count (•denotes a total number of times word w occurred in a document; and $\lambda$ is a smoothing parameter.

11. The system according to claim 7, wherein:
based on the size of a display screen of a mobile device, the user sets a total number of recommended app functions included in the ranked app function list.

12. The system according to claim 7, wherein:
provided that $v_s \in R^D$ denotes a structured input, and $h_s^{(1)}$, $h_s^{(2)} \in \{0,1\}$ are binary stochastic hidden units, a probability that the structured feature two-layer DBM assigns to vertex $v_s$ is defined by:

$$p(v_s; \theta_s) = \sum_{h_s^{(1)}, h_s^{(2)}} p(v_s, h_s^{(1)}, h_s^{(2)}; \theta_s) = \frac{1}{z(\theta_s)} \sum_{h_s^{(1)}, h_s^{(2)}} \exp(-E(v_s, h_s^{(1)}, h_s^{(2)}; \theta_s))$$

wherein $$E(v_s, h_s^{(1)}, h_s^{(2)}; \theta_s) = -\sum_{i=1}^{D} \frac{(v_{si} - b_i)^2}{2\sigma_i^2} + \sum_{i=1}^{D} \sum_{j=1}^{F_1} \frac{v_{si}}{\sigma_i} W_{ij}^{(1)} h_j^{(1)} + \sum_{j=1}^{F_1} \sum_{l=1}^{F_2} h_j^{(1)} W_{jl}^{(2)} h_l^{(2)}$$

is an energy function, and $\theta_s = \{b, W^{(1)}, W^{(2)}, \sigma\}$ are model parameters.

13. A non-transitory computer-readable medium having computer program for, when being executed by a processor, performing a method for multimodal clue based personalized app function recommendation, the method comprising:
receiving an app search query from a user;
obtaining a plurality of real-time clues collected from the user;
extracting a plurality of features to represent the plurality of real-time clues collected from the user, wherein the plurality of features include structured features and text features;
based on the plurality of extracted features, generating a joint representation of a multimodal clue, comprising:
using a multimodal Deep Boltzmann Machine (DBM) to construct two separate two-layer DBMs to model distribution over the structured features and the text features respectively; and
combining the two separate two-layer DBMs by adding an additional layer of binary hidden units on the top of the two-layer DBMs;

based on the joint representation of the multimodal clue, creating a logistic regression model;
ranking a list of app functions using the logistic regression model; and
displaying a ranked app function list for the user.

14. The non-transitory computer-readable medium according to claim 13, wherein obtaining the plurality of real-time clues collected from the user further includes:
collecting structured spatiotemporal signals captured by multiple types of sensors, wherein the structured spatiotemporal signals include time, latitude, longitude, speed, and GPS accuracy; and
collecting unstructured text data from one of app content pages and the user.

15. The non-transitory computer-readable medium according to claim 13, wherein ranking the list of app functions using the logistic regression model further includes:
calculating app scores to filter out irrelevant app functions; and
based on the calculated app scores, ranking the list of relevant app functions that are scored.

16. The non-transitory computer-readable medium according to claim 13, the method further including:
based on the size of a display screen of a mobile device, setting, by the user, a total number of recommended app functions included in the ranked app function list.

* * * * *